(12) United States Patent
Hartsuiker et al.

(10) Patent No.: US 7,930,903 B2
(45) Date of Patent: Apr. 26, 2011

(54) METHOD FOR MANUFACTURING A PREFORM AS WELL AS A METHOD FOR FORMING OPTICAL FIBRES FROM SUCH A PREFORM

(75) Inventors: Johannes Antoon Hartsuiker, Amsterdam (NL); Igor Milicevic, Helmond (NL); Mattheus Jacobus Nicolaas Van Stralen, Tilburg (NL); Rob Hubertus Matheus Deckers, Eindhoven (NL); Marco Korsten, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 518 days.

(21) Appl. No.: 12/109,979

(22) Filed: Apr. 25, 2008

(65) Prior Publication Data
US 2009/0173107 A1    Jul. 9, 2009

(30) Foreign Application Priority Data
Apr. 27, 2007   (NL) ...................................... 1033769

(51) Int. Cl.
*C03B 37/018* (2006.01)
(52) U.S. Cl. ................. 65/377; 65/391; 65/417; 65/419
(58) Field of Classification Search ..................... 65/391, 65/417, 377, 418, 419
See application file for complete search history.

(56) References Cited

U.S. PATENT DOCUMENTS

| | | | |
|---|---|---|---|
| 3,909,110 A * | 9/1975 | Marcuse | 385/28 |
| 4,741,747 A | 5/1988 | Geittner et al. | |
| 4,944,244 A | 7/1990 | Moisan et al. | |
| 5,188,648 A | 2/1993 | Geittner et al. | |
| 2001/0010162 A1 * | 8/2001 | Kuwahara et al. | 65/381 |

FOREIGN PATENT DOCUMENTS

| | | |
|---|---|---|
| EP | 0038982 A2 | 11/1981 |
| EP | 0333580 A1 | 9/1989 |
| GB | 2118165 A | 10/1983 |
| JP | 53108445 * | 9/1978 |
| JP | 57051139 * | 3/1982 |
| JP | 60-5034 * | 1/1985 |

* cited by examiner

*Primary Examiner* — John Hoffmann
(74) *Attorney, Agent, or Firm* — Adams Law Group of Oliff & Berridge

(57) ABSTRACT

A method for manufacturing a preform for optical fibers by means of a vapor deposition process, wherein plasma conditions are created and wherein the plasma is moved back and forth along the longitudinal axis of the hollow substrate tube between a reversal point near the supply side and a reversal point near the discharge side of the hollow substrate tube, so that the location where the soot deposition associated with one phase takes place is axially spaced from the location where the soot deposition associated with the other phase(s) takes place.

9 Claims, 9 Drawing Sheets

METHOD FOR MANUFACTURING A PREFORM AS WELL AS A METHOD FOR FORMING OPTICAL FIBRES FROM SUCH A PREFORM

TECHNICAL FIELD AND BACKGROUND OF THE INVENTION

1. Field of the Invention

The present invention relates to a method for manufacturing a preform for optical fibers by a vapour deposition process, and a method for forming optical fibers in which the optical preform is heated at one end from which optical fiber is subsequently drawn.

2. Background of the Invention

Methods for manufacturing a preform for optical fibers by means of a vapour deposition process, and methods for forming optical fibers in which an optical preform is heated at one end from which an optical fiber is drawn are described in Dutch Patent NL 1 023 438.

Preforms for optical fibers are formed by means of an internal chemical vapour deposition technique (CVD), in particular plasma chemical vapour deposition (PCVD), wherein reactive glass-forming gases, possibly doped, are reacted inside a hollow glass substrate tube, resulting in the deposition of one or more glass layers on the inner surface of the hollow substrate tube. Such reactive gases are supplied on one side of the substrate tube, in other words, the supply side, and as a result of the special process conditions they form glass layers on the interior of the substrate tube. An energy source is moved back and forth along the length of the substrate tube for forming the glass layers. The energy source, in particular a plasma generator, supplies high-frequency energy, thereby generating a plasma in the interior of the substrate tube, under which plasma conditions the reactive glass-forming gases will react (the plasma CVD technique). It is also possible, however, to supply the energy in the form of heat, in particular by means of burners, on the outer side of the substrate tube or via a furnace that surrounds the substrate tube. The aforesaid techniques have this in common, that the energy source is moved back and forth with respect to the substrate tube.

A drawback of the techniques described above is the fact that defects may develop in the deposited layers near the reversal points as a result of the reciprocating movement of the energy source. Such defects are called "taper," in which context a distinction is furthermore made between geometric taper and optic taper. The term "geometric taper" is understood to mean that the thickness of the total deposition, in other words, of all the glass layers, is not constant along the length of the tube. The term "optic taper" is understood to mean that the optical properties, which are mainly determined from the fiber that is eventually drawn, are not constant along the length of the preform. Optic taper is to a minor extent caused by deviations in the layer thickness, but mainly by deviations in the refractive index, or refractive index profiles, along the length of the preform. Besides an adequate control of the geometric taper, it is also desirable that the deviations in the refractive index contrast A be as small as possible over a maximum length of the preform so as to realize an adequate control of the optical properties of the fibers to be formed.

A disadvantage of taper is the fact that the useful length of the preform is limited, which means that a smaller amount of fiber can be obtained from one preform. In addition to that, the properties of an optical fiber may not be constant along the length of the fiber due to said taper.

U.S. Pat. No. 4,741,747 relates to a method for manufacturing a preform for optical fibers, in which the reduction of so-called end taper is intended to take place by moving the plasma nonlinearly as a function of time in the region of the reversal point and/or by varying the intensity of the plasma along the length of the glass substrate tube.

European patent application No. 0 038 982 relates to a method for manufacturing a preform for optical fibers, in which the plasma generator is moved along the length of the substrate tube, which plasma generator produces a hot zone, such that said hot zone can be regarded as a so-called "tandem hot zone" comprising at least two zones, in other words, zone I and zone II.

European patent application No. 0 333 580 relates to a method for manufacturing preforms for optical fibers, in which a variable power microwave generator is used, but in which no use is made of a non-isothermal plasma that is moved back and forth between two reversal points along the length of the substrate tube.

British patent publication GB 2 118 165 relates to a method for manufacturing a preform for an optical fiber in which the velocity of the heat source axially along the substrate tube is in accordance with a specific mathematical equation, said velocity being a function of the position of said heat source along said tube, so that the total deposition thickness of the glass layers is claimed to be substantially constant along the length of said tube.

U.S. Pat. No. 5,188,648 granted in the name of the present applicant provides a method for manufacturing a preform of optical fibers in which the movement of the plasma is interrupted each time the plasma reaches the reversal point near the gas inlet point of the substrate tube, whilst the glass deposition continues, where interruption of the plasma movement lasts at least 0.1 seconds.

It has been found that soot deposition takes place at the supply side of the substrate tube during the deposition step, which soot deposition manifests itself as a ring on the inner surface of the hollow substrate tube, which ring also extends along a specific length of the substrate tube. It is assumed that such soot deposition takes place as a result of the relatively low intensity of the plasma in the region where the deposition takes place. It is further assumed that the temperature on the inner surface of the hollow substrate tube at the beginning of the deposition process plays an important part in the formation of such a soot ring. The presence of such a soot ring will have an adverse effect on the effective length of the preform. After all, the region of the soot ring in the substrate tube cannot be used for forming an optical fiber therefrom which meets the required product specifications. Another drawback of the so-called soot deposition is the fact that if a number of soot rings more or less overlap, there is a significant risk of fracture of glass layers, which means a loss of preform rod, which is undesirable.

BRIEF SUMMARY OF THE INVENTION

Accordingly, it is an object of the present invention to provide a method for manufacturing a preform for optical fibers, in which the occurrence of undesirable fracture of glass layers is minimized.

It is another object of the present invention to provide a method for manufacturing a preform for optical fibers by which a preform having a maximum effective preform length for drawing optical fibers therefrom is obtained.

To achieve the foregoing and other objects and advantages, and in accordance with the purposes of the invention as embodied and broadly described herein, the present invention provides a method for manufacturing a preform for optical fibers by a vapour deposition process, wherein the method including:
i) providing a hollow glass substrate tube having a supply side and a discharge side,
ii) supplying doped or undoped glass-forming gases to the interior of the hollow substrate tube via the supply side thereof,
iii) creating temperature and plasma conditions in the interior of the hollow substrate tube for effecting the deposition of glass layers on the inner surface of the hollow substrate tube, which deposition is to be regarded as comprising a number of separate phases, each phase having an initial refractive index value and a final refractive index value and comprising the deposition of a number of glass layers, the plasma being moved back and forth along the longitudinal axis of the hollow substrate tube between a reversal point near the supply side and a reversal point near the discharge side of the hollow substrate tube, whilst deposition of soot takes place at the supply side of the substrate tube, and
iv) consolidating the substrate tube obtained in step iii) into the preform, wherein the position of the reversal point near the supply side of the substrate tube is shifted along the longitudinal axis of the substrate tube in step iii), such that the location where the soot deposition associated with one phase takes place is axially spaced from the location where the soot deposition associated with the other phase(s) takes place.

The position of the reversal point near the supply side is shifted along the longitudinal axis of the substrate tube in the direction of the discharge side for each phase in step iii). In one embodiment, the axial spacing is at least about 2 mm. In another embodiment, the axial spacing is at least about 5 mm. The axial position of the reversal point near the supply side of the substrate tube is set at the beginning of each phase in step iii) and is stationary during said phase.

In one embodiment, in step iii), the temperature of the substrate tube near the supply side is set so that the soot deposition of each phase has a width of maximally 10 cm, measured along the longitudinal axis of the substrate tube. In another embodiment, the temperature is set so that the soot deposition of each phase has a width of maximally 5 cm, measured along the longitudinal axis of the substrate tube. In another embodiment, the axial position of the reversal point near the discharge side is stationary during at least part of step iii).

In another embodiment, the present invention provides a method for forming an optical fiber in which an optical preform is heated at one end, from which optical preform an optical fiber is subsequently drawn, wherein the preform is obtained by a method provided above.

In yet another embodiment, the present invention provides a hollow glass substrate tube to be used as a preform for forming optical fibers by heating one end of the preform and drawing an optical fiber from the heated end, wherein the preform has one or more soot rings on the interior thereof, and wherein the axial spacing between the one or more soot rings is preferably at least 2 mm, measured in the longitudinal direction of the hollow glass substrate tube. In an alternative embodiment, the axial spacing between the one or more soot rings is at least 5 mm, measured in the longitudinal direction of the hollow glass substrate tube. The width of each of the one or more soot rings is maximally 10 cm, measured in the longitudinal direction of the hollow glass substrate tube.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
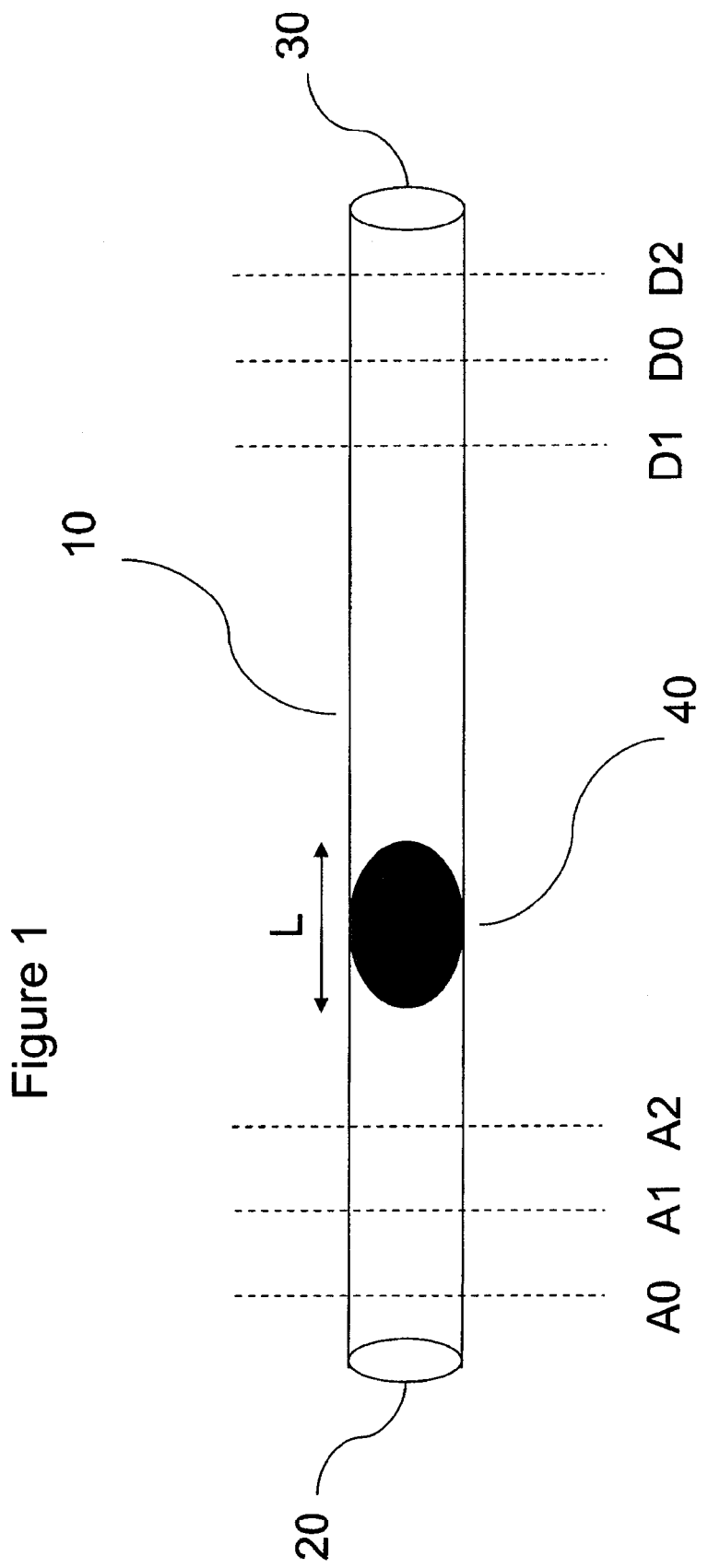
FIG. 1 is a schematic view of a substrate tube.

The present invention will now be described with reference to the drawings. Although specific embodiments are shown, the invention is not limited to the embodiments shown and may be embodied in many different forms. The embodiments are provided so that this disclosure is both thorough and complete, and will fully convey the scope of the invention and will enable one of ordinary skill in the art to make, use and practice the invention. Like reference numerals refer to like elements throughout the various drawings.

In one embodiment, the present invention provides a method for manufacturing a preform for optical fibers by means of a vapour deposition process. The method includes:
i) providing a hollow glass substrate tube having a supply side and a discharge side,
ii) supplying doped or undoped glass-forming gases to the interior of the hollow substrate tube via the supply side thereof,
iii) creating temperature and plasma conditions in the interior of the hollow substrate tube for effecting the deposition of glass layers on the inner surface of the hollow substrate tube, which deposition is to be regarded as comprising a number of separate phases, each phase having an initial refractive index value and a final refractive index value and comprising the deposition of a number of glass layers, the plasma being moved back and forth along the longitudinal axis of the hollow substrate tube between a reversal point near the supply side and a reversal point near the discharge side of the hollow substrate tube, whilst deposition of soot takes place at the supply side of the substrate tube, and
iv) consolidating the substrate tube obtained in step iii) into the preform, characterised in that the position of the reversal point near the supply side of the substrate tube is shifted along the longitudinal axis of the substrate tube in step iii), such that the location where the soot deposition associated with one phase takes place is axially spaced from the location where the soot deposition associated with the other phase(s) takes place.

The present invention provides that a systematic positioning of the soot rings along the length of the substrate tube prevents the occurrence of an overlap between various soot rings, thereby minimizing the occurrence of layer fracture. Thus, it is desirable to position the reversal point near the supply side of the substrate tube at a suitable location for each phase of the deposition process. The term "phase" as used in the present application is to be understood to mean a part of the deposition process in which glass layers having a specific refractive index value, which value may be constant or exhibit a gradient, are deposited. For example, in a simple step-index profile a core and a cladding can be distinguished, with the deposition of the core and the deposition of the cladding being regarded as two separate phases.

The refractive index of the core may have a flat profile, in other words, a constant refractive index value, or a profile exhibiting a specific gradient, for example a parabolic gradient. In the case of a W-type refractive index profile consisting of shells or slices each having different refractive index values, each shell, which comprises a number of glass layers, may be regarded as a separate phase, which phase includes its own position of the reversal point near the supply side of the substrate tube, which reversal point is in particular set at the beginning of the deposition of the phase in question and which is kept stationary during the course of the deposition of the phase in question. Subsequently, when the deposition of another phase commences, the position of the reversal point at the supply side is set anew and is kept stationary during the phase in question. Using such a specific, phase-dependent positioning of the reversal point near the supply side, which is set at the beginning of each phase, soot rings of one phase are effectively prevented from exhibiting an overlap with soot rings of (an)other phase(s). According to the methods provided herein, there is no question of an overlap of soot rings, and there is no undesirable layer crack, thus the effective preform length of the substrate tube is greater than in the situation in which soot rings do overlap.

In an embodiment of the present invention, the position of the reversal point near the supply side is shifted along the longitudinal axis of the substrate tube in the direction of the discharge side for each phase in step iii). Since the soot rings of various deposition phases are thus prevented from overlapping, layer cracking is prevented. Layer cracking is attributed to the fact that a high stress level will cause fracture at the location of the irregularities in the glass, which irregularities occur in particular in soot rings.

When the axial spacing between soot deposition of one phase and soot deposition of the other phase is at least about 2 mm, there is no layer cracking. Axial spacing is preferably at least about 5 mm. The term "axial spacing" is understood to mean the distance in the direction of the length of the substrate tube. An axial spacing of at least 2 mm means that the soot deposition of one phase, which has a specific width, is removed from the soot deposition of the other phase(s) by at least 2 mm, in which case the possibility of overlap of the soot depositions is minimized. Thus, a systematic positioning method of the soot rings is provided in order to prevent layer cracking in preforms. Thus, it is desirable to select a correct position of the reversal point near the supply side and subsequently determine the axial width of the soot ring on the substrate tube, after the deposition process. It is desirable to determine the width of the soot ring and the position of the reversal point of the resonator, in particular near the supply side of the substrate tube, for each deposition phase. Such a measurement can be carried out by manufacturing a preform in which the reversal point at the gas supply side is shifted in the direction of the discharge side for each phase. After the entire deposition process has been terminated, the preform obtained is inspected to determine the starting position and the width of the soot ring for each phase.

If the width of the soot ring is more than 5 cm, it is particularly desirable to increase the temperature of the substrate tube at the supply side for the phase in question. The increase of the temperature has an influence on the width of the soot ring. Once the aforesaid operations have been carried out, information has been obtained regarding the exact position of the reversal point at the gas supply side for each phase, and that in such a manner that the soot rings of each phase do not overlap. Using the present method, it is thus possible to prevent layer cracking at the supply side of the substrate tube.

For a temperature of the substrate tube at the supply side having a relatively low value, for example lower than 1000° C., the width of the soot rings will increase undesirably. Under such circumstances, it is preferable to increase the temperature at the supply side of the substrate tube such that the width of the soot deposition of each phase is maximally 10 cm, preferably maximally 5 cm. Since the aforesaid layer cracking occurs mainly at the supply side of the substrate tube, the axial position of the reversal point near the discharge side is stationary at least during part of step iii).

In another embodiment, the present invention further provides a method for forming an optical fiber in which an optical preform is heated at one end, from which optical preform an optical fiber is subsequently drawn, using a preform as obtained by means of the present method. The method includes providing a hollow glass substrate tube for forming optical fibers by first collapsing the substrate tube into a massive rod, i.e. a preform, and heating one end of the preform and drawing an optical fiber from the heated end, which hollow glass substrate tube has one or more soot rings on the interior thereof, wherein the axial spacing between said one or more soot rings is preferably at least 2 mm, in particular at least 5 mm, measured in the longitudinal direction of the hollow glass substrate tube. Such a hollow glass substrate tube further includes that the width of each of the one or more soot rings is maximally 10 cm, in particular maximally 5 cm, measured in the longitudinal direction of the hollow glass substrate tube.

EXPERIMENTAL RESULTS

Example 1

Figure 3:
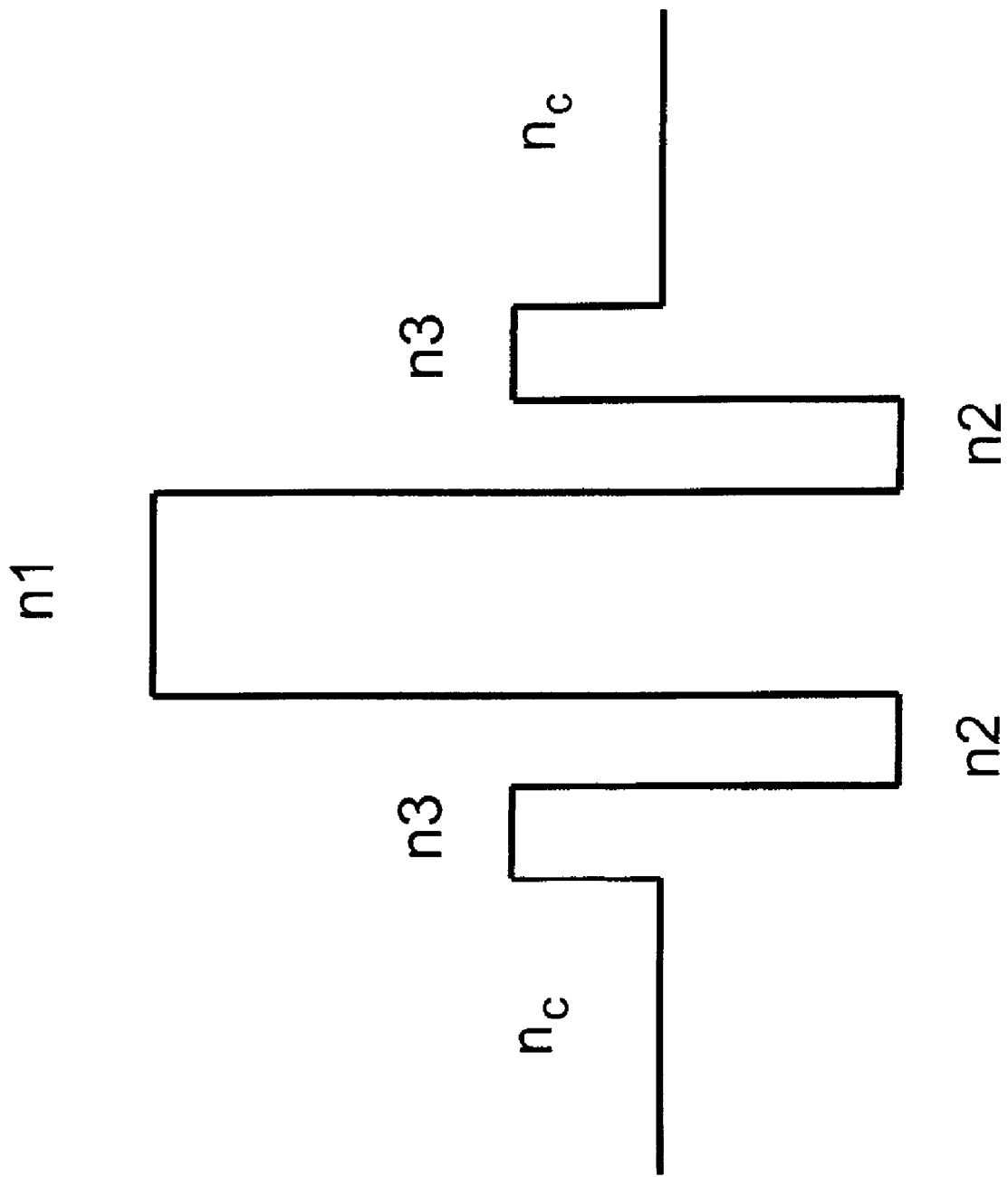
FIGS. 3-9 are schematic diagrams showing various refractive index profiles, measured on a consolidated preform.

A mixture of glass-forming gases was supplied to the hollow glass substrate tube 10 shown in FIG. 1, at the supply side 20 thereof, so as to effect deposition on the interior of the hollow substrate tube 10. The undeposited gases and any gases formed in the reaction for forming the glass layers were discharged at the discharge side 30 of the substrate tube 10. To effect the deposition of glass layers, a plasma 40 was generated in the interior of the substrate tube 10, which plasma 40 was moved back and forth between a reversal point near the supply side 20 and a reversal point near the discharge side 30 during the deposition process, using a resonator (not shown) fully surrounding the hollow substrate tube 10. The resonator and the hollow substrate tube 10 are usually enclosed by a furnace (not shown). At the beginning of the deposition process, the reversal point near the supply side 20 of the hollow substrate tube 10 was set at position A0. While the reversal point was maintained at A0, a number of glass layers having a refractive index corresponding to a value n3, as schematically shown in FIG. 3, were deposited on the interior of the substrate tube 10. After the deposition of glass layers having a refractive index value n3, which deposition may be considered as one separate phase, the reversal point near the supply side 20 was shifted to position A1, after which a second deposition phase took place, in which glass layers having a refractive index value n2 were deposited, as shown in FIG. 3. Subsequently, the position of the reversal point near the supply side 20 was shifted to position A2 for a final deposition phase, in which glass layers having a refractive index value n1 were deposited. It will be understood that the number of deposition phases can be set according to what is required.

Figure 2:
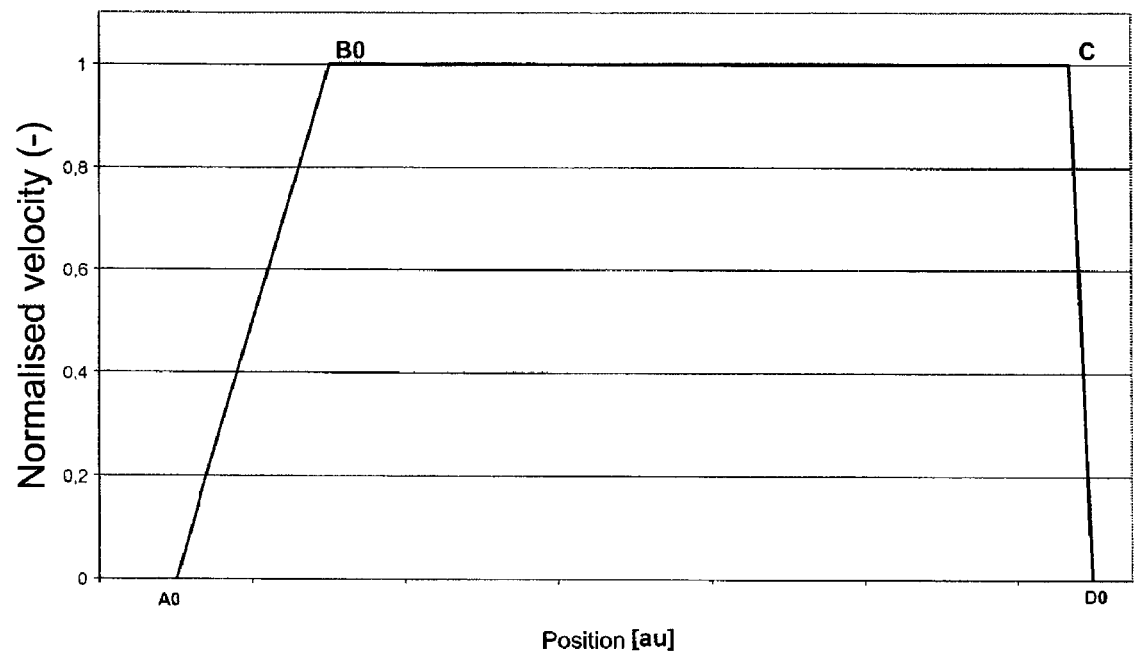
FIG. 2 is a graph showing a velocity profile of the plasma moving back and forth over the substrate tube of FIG. 1.

In FIG. 2, the velocity profile of the plasma 40 is schematically shown, with the position on the hollow glass substrate tube 10 being plotted on the horizontal axis and the normalised velocity of the plasma 40, in particular the resonator, being plotted on the vertical axis. FIG. 2 clearly shows that when the plasma moves from A0 to B0, with B0 corresponding to the position to the right of A0 in FIG. 1, the velocity of the plasma increases. In the stretch B0-C, in which the plasma 40 is thus moved from the supply side 20 to the discharge side 30, the velocity of the plasma 40 is in principle kept constant.

Near point C, the velocity of the plasma 40 will be reduced to a value of zero, with the plasma 40 returning to the supply side 20 near reversal point D0. The stretch A0-B0-C-D0 is covered many times during a specific deposition phase.

The refractive index profile of the consolidated preform corresponds to the refractive index profile of the optical fiber drawn from such a preform. In FIG. 3, the designation $n_c$ corresponds to the refractive index value of the substrate tube. During the aforesaid deposition process, in which three phases can thus be distinguished, the position of the reversal point near the discharge side 30 was kept constant. It is also possible, however, to shift the reversal point near the discharge side 30 during the deposition process, in which case a position corresponding to D0, D1 or D2 can be taken up. To realize an axial spacing of at least 5 mm between the soot rings of each deposition phase on the substrate tube 10, position A0 was set at 0 mm, position A1 was set at 30 mm and position A2 was set at 60 mm, which means that the reversal point near the supply side 20 was shifted over a distance of 30 mm in the direction of the discharge side 3 for each of the aforesaid phases. Furthermore, the acceleration or deceleration near the reversal point was kept constant for each phase both at the supply side and at the discharge side.

Figure 4:
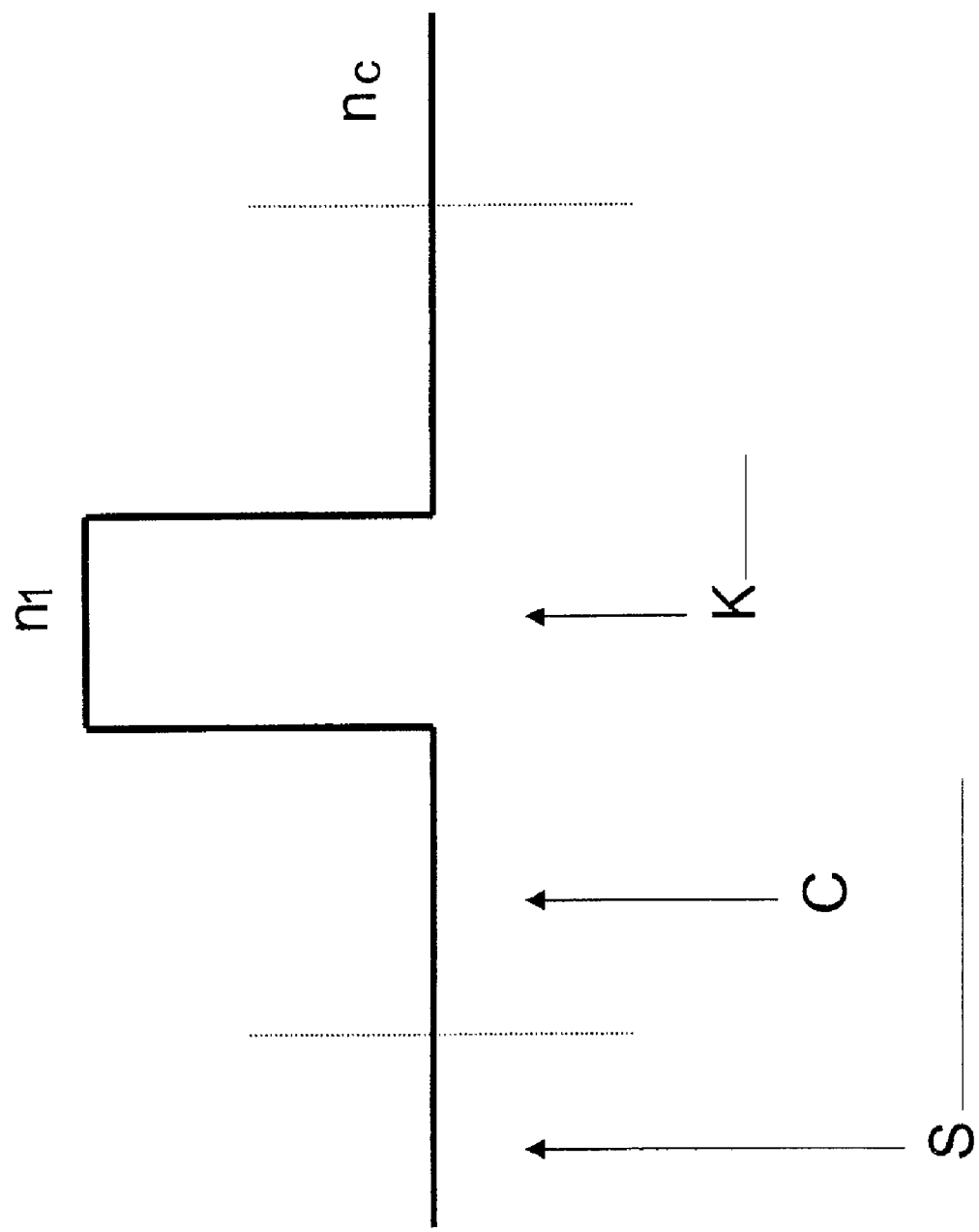

FIG. 4 schematically shows a refractive index profile of a consolidated preform (not shown), in which the deposition process in fact comprises two separate phases, viz. the deposition on the interior of the hollow substrate tube (not shown) of a cladding C or shell whose refractive index value corresponds to that of the substrate tube S, and a deposition phase in which glass layers having a refractive index value n1, n1 corresponding to the core K, were deposited.

Figure 5:
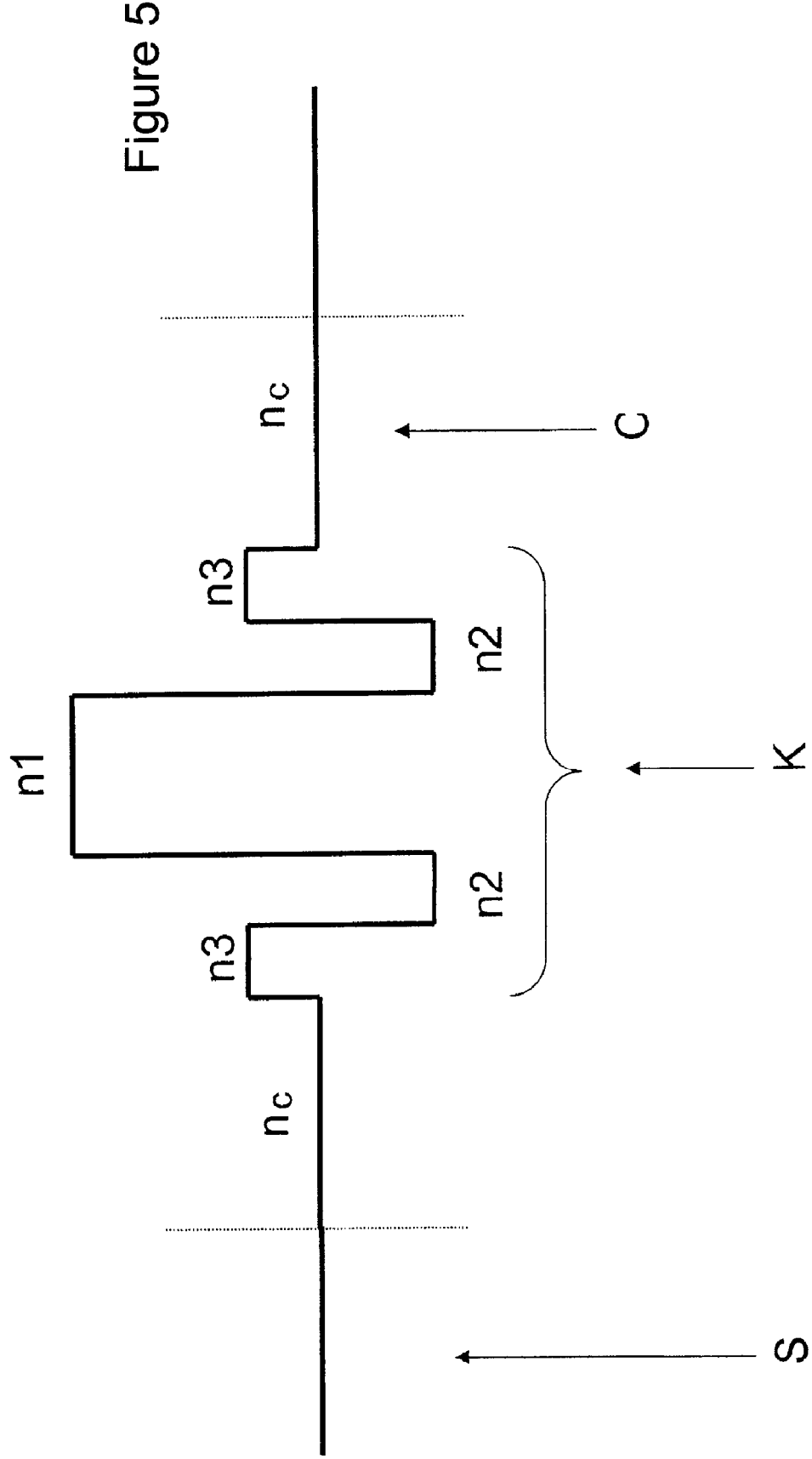

FIG. 5 schematically shows the refractive index profile of a consolidated preform (not shown), in which the deposition process comprises four separate phases, viz. first the deposition on the interior of the substrate tube S of a cladding C having a refractive index value $n_c$, followed by the deposition of a shell having a refractive index value n3, a shell having a refractive index value n2 and a core portion K having a refractive index value n1. During the deposition of the aforesaid four phases, the reversal point near the supply side of the hollow substrate tube was determined at the beginning of each phase, and kept constant during the phase in question, said reversal point taking up a unique position for each phase.

Figure 6:
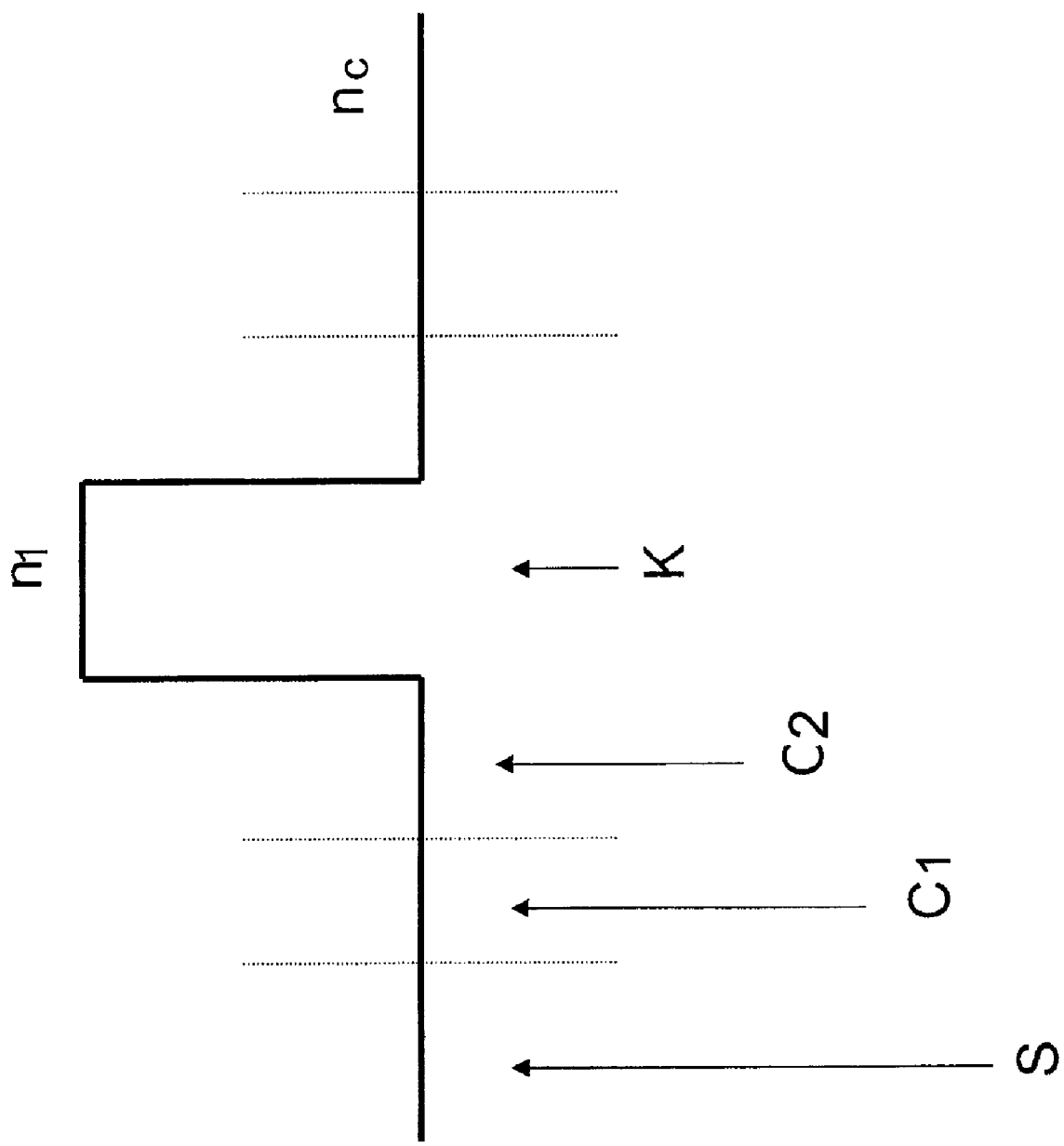

FIG. 6 schematically shows the refractive index profile of a consolidated preform (not shown), in which three separate phases can be distinguished, viz. a cladding 1 C1 having a refractive index value $n_c$, a cladding 2 C2 having a refractive index value $n_c$, and a core portion having a refractive index value n1, cladding 1 and cladding 2 having different chemical compositions but equal refractive index values. The position of the reversal point near the supply side was set at the beginning of the deposition process for each individual phase, after which the reversal point near the supply side was determined anew for each successive phase.

Figure 7:
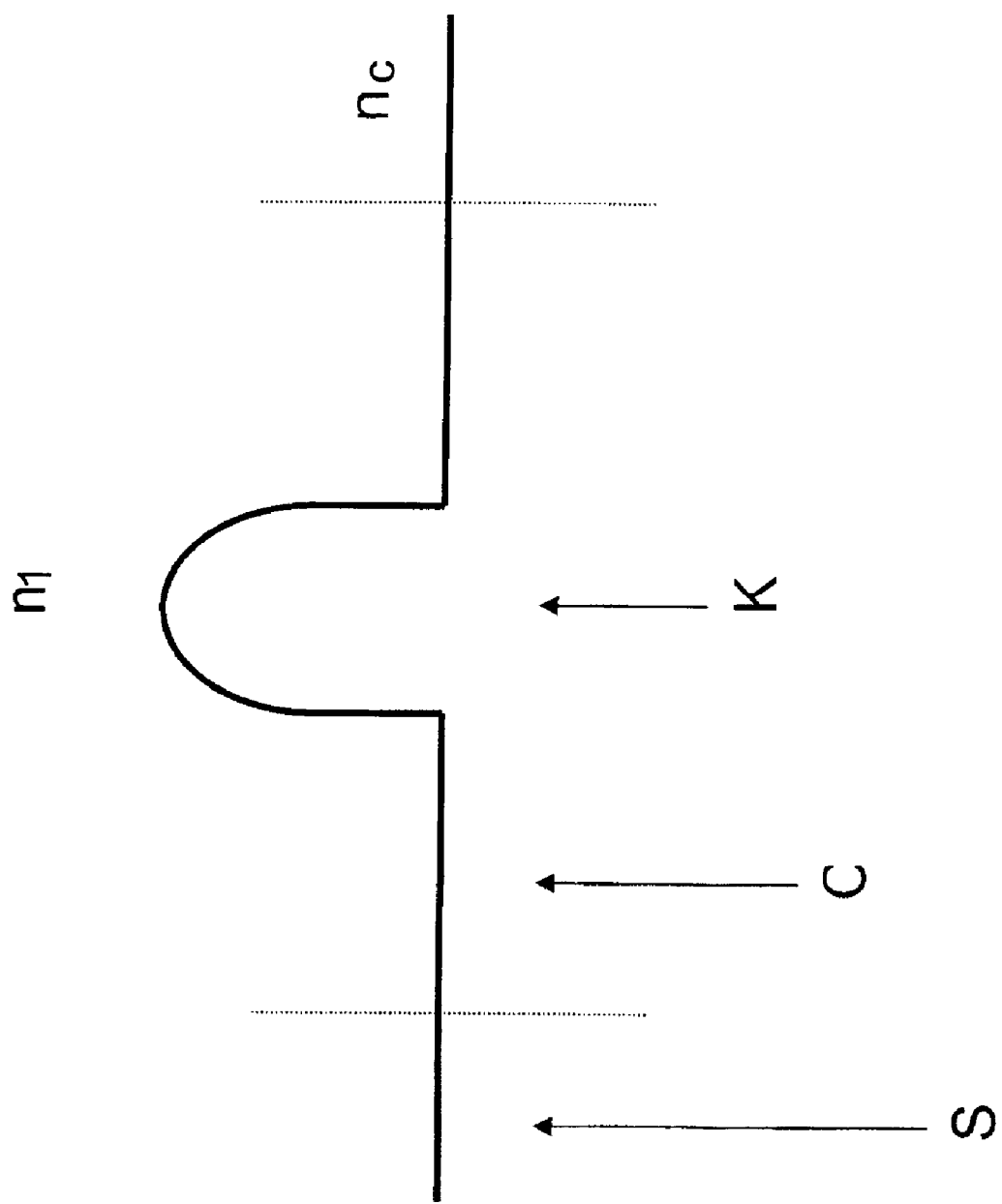

FIG. 7 schematically shows the refractive index profile of a consolidated preform (not shown), in which the deposition process comprises two phases, viz. a first phase, in which a cladding C having a refractive index value $n_c$ was deposited, followed by the deposition of a core portion K having a refractive index value n1. FIG. 7 clearly shows that the core portion exhibits a refractive index gradient. The reversal point near the supply side was determined at the beginning of each phase.

Figure 8:
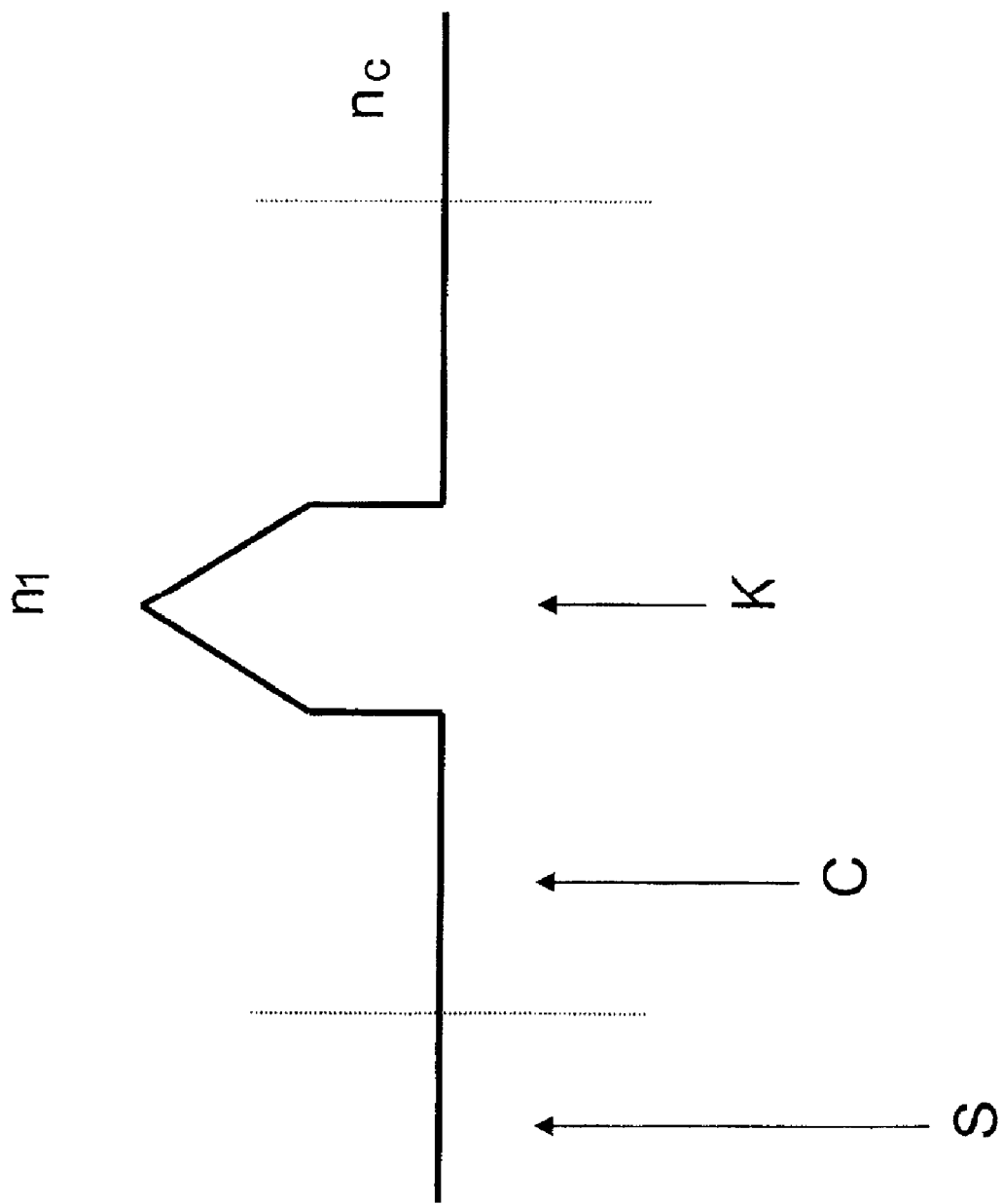

The refractive index profile shown in FIG. 8 substantially corresponds to that of FIG. 7, except that the core portion now exhibits a linear gradient instead of a parabolic gradient as shown in FIG. 7.

Figure 9:
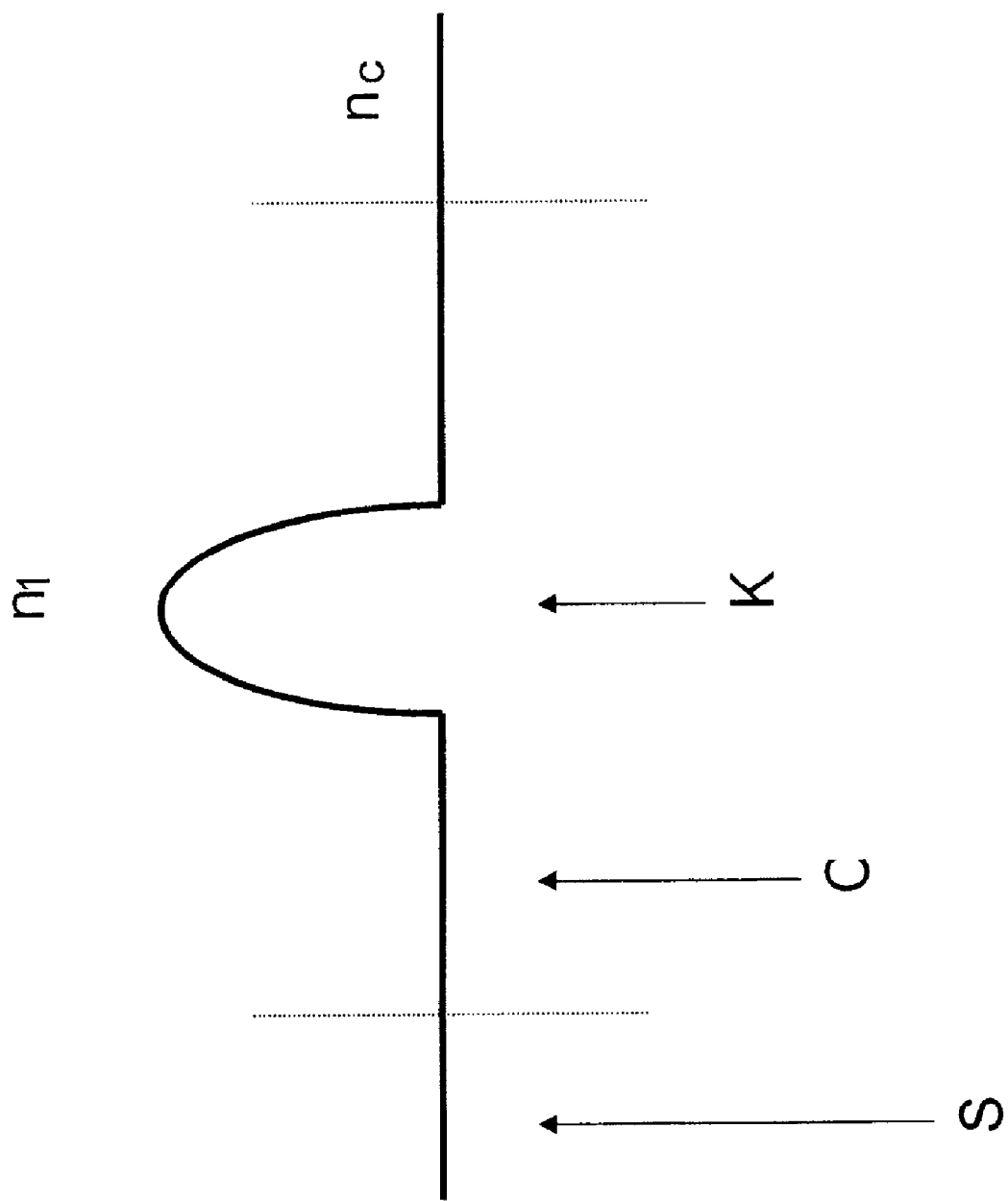

The refractive index profile shown in FIG. 9 substantially corresponds to that of FIG. 7, except that in FIG. 9 the parabolic gradient of the core already starts at the edges of the core portion, whilst in the refractive index profile of FIG. 7 the refractive index value first exhibits a "leap", after which the refractive index value follows a parabolic gradient.

The present invention is in particular aimed at setting the position of the reversal point near the supply side such that a soot ring associated with such a phase will not overlap the soot ring(s) of (an)other deposition phase(s).

What is claimed is:

1. A method for manufacturing a preform for optical fibers by a vapour deposition process, the method comprising the steps:
   i) providing a hollow glass substrate tube having a supply side and a discharge side,
   ii) supplying doped or undoped glass-forming gases to the interior of the hollow substrate tube via the supply side thereof,
   iii) creating temperature and plasma conditions in the interior of the hollow substrate tube for effecting the deposition of glass layers on the inner surface of the hollow substrate tube, where deposition is to be regarded as comprising a number of separate phases, each phase having an initial refractive index value and a final refractive index value and comprising the deposition of a number of glass layers, plasma being moved back and forth along the longitudinal axis of the hollow substrate tube between a reversal point near the supply side and a reversal point near the discharge side of the hollow substrate tube, while deposition of soot takes place at the supply side of the substrate tube, and
   iv) consolidating the substrate tube obtained in step iii) into the preform, where the position of the reversal point near the supply side of the substrate tube is shifted along the longitudinal axis of the substrate tube in step iii), such that the location where the soot deposition associated with one phase takes place is axially spaced from the location where the soot deposition associated with the other phase(s) takes place.

2. The method according to claim 1, wherein the position of the reversal point near the supply side is shifted along the longitudinal axis of the substrate tube in the direction of the discharge side for each phase in step iii).

3. The method according to claim 1, wherein axial spacing is at least 2 mm.

4. The method according to claim 1, wherein axial spacing is at least 5 mm.

5. The method according to claim 1, wherein the axial position of the reversal point near the supply side of the substrate tube is set at the beginning of each phase in step iii) and is stationary during the phase.

6. The method according to claim 1, wherein in step iii) the temperature of the substrate tube near the supply side is set so that the soot deposition of each phase has a maximum width of about 10 cm, measured along the longitudinal axis of the substrate tube.

7. The method according to claim 1, wherein in step iii) the temperature of the substrate tube near the supply side is set so that the soot deposition of each phase has a maximum width of about 5 cm, measured along the longitudinal axis of the substrate tube.

8. The method according to claim 1, wherein the axial position of the reversal point near the discharge side is stationary during at least part of step iii).

9. A method for forming an optical fiber in which an optical preform is heated at one end, from which optical preform an optical fiber is subsequently drawn, comprising the steps:
 (a) manufacturing a preform by a vapour deposition process comprising the steps:
  i) providing a hollow glass substrate tube having a supply side and a discharge side,
  ii) supplying doped or undoped glass-forming gases to the interior of the hollow substrate tube via the supply side thereof,
  iii) creating temperature and plasma conditions in the interior of the hollow substrate tube for effecting the deposition of glass layers on the inner surface of the hollow substrate tube, where deposition is to be regarded as comprising a number of separate phases, each phase having an initial refractive index value and a final refractive index value and comprising the deposition of a number of glass layers, plasma being moved back and forth along the longitudinal axis of the hollow substrate tube between a reversal point near the supply side and a reversal point near the discharge side of the hollow substrate tube, while deposition of soot takes place at the supply side of the substrate tube, and
  iv) consolidating the substrate tube obtained in step iii) into the preform, where the position of the reversal point near the supply side of the substrate tube is shifted along the longitudinal axis of the substrate tube in step iii), such that the location where the soot deposition associated with one phase takes place is axially spaced from the location where the soot deposition associated with the other phase(s) takes place, and
 (b) heating the preform at one end and drawing an optical fiber from the preform.

* * * * *